US010880910B2

(12) United States Patent
Kwak et al.

(10) Patent No.: US 10,880,910 B2
(45) Date of Patent: Dec. 29, 2020

(54) 2-STEP SCI TRANSMISSION OF NR V2X

(71) Applicant: LG Electronics Inc., Seoul (KR)

(72) Inventors: Kyuhwan Kwak, Seoul (KR); Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/824,528

(22) Filed: Mar. 19, 2020

(65) Prior Publication Data

US 2020/0288486 A1    Sep. 10, 2020

Related U.S. Application Data

(63) Continuation of application No. PCT/KR2020/001229, filed on Jan. 23, 2020.

(60) Provisional application No. 62/795,597, filed on Jan. 23, 2019.

(51) Int. Cl.
*H04W 72/12* (2009.01)
*H04W 72/04* (2009.01)
*H04W 92/18* (2009.01)

(52) U.S. Cl.
CPC ... *H04W 72/1263* (2013.01); *H04W 72/0406* (2013.01); *H04W 72/0446* (2013.01); *H04W 72/0453* (2013.01); *H04W 92/18* (2013.01)

(58) Field of Classification Search
CPC ......... H04W 72/1263; H04W 72/1278; H04W 72/1284; H04W 72/1289; H04W 72/1294; H04W 72/0406; H04W 72/044; H04W 72/0446; H04W 72/0453; H04W 92/16; H04W 92/18
See application file for complete search history.

(56) References Cited

U.S. PATENT DOCUMENTS

| 2017/0048905 | A1* | 2/2017 | Yun | H04L 5/0091 |
| 2017/0290020 | A1* | 10/2017 | Aiba | H04W 8/005 |
| 2018/0139724 | A1* | 5/2018 | Loehr | H04W 72/02 |
| 2018/0234220 | A1* | 8/2018 | Yasukawa | H04W 72/04 |
| 2018/0234888 | A1* | 8/2018 | Yasukawa | H04W 4/40 |
| 2018/0376474 | A1* | 12/2018 | Khoryaev | H04W 76/14 |

(Continued)

FOREIGN PATENT DOCUMENTS

| KR | 20180036355 | 4/2018 |
| KR | 2018-0135867 | 12/2018 |

(Continued)

OTHER PUBLICATIONS

Huawei, "Introduction of 5G V2X sidelink features into TS 38.212," R1-1913642, 3GPP TSG-RAN WG1 Meeting #99, Reno, USA, dated Nov. 18-22, 2019, 10 pages.

(Continued)

*Primary Examiner* — Kevin D Mew
(74) *Attorney, Agent, or Firm* — Fish & Richardson P.C.

(57) ABSTRACT

An embodiment of the present disclosure provides a method of performing sidelink (SL) communication by a first apparatus. The method includes transmitting a first sidelink control information (SCI) to a second apparatus through physical sidelink control channel (PSCCH), and transmitting a second SCI to the second apparatus through physical sidelink shared channel (PSSCH) related to the PSCCH, wherein the first SCI includes information for resource of the second SCI.

13 Claims, 26 Drawing Sheets

(56) References Cited

U.S. PATENT DOCUMENTS

| | | | |
|---|---|---|---|
| 2019/0075566 A1* | 3/2019 | Kim | H04B 17/345 |
| 2019/0215695 A1* | 7/2019 | Yang | H04L 9/3271 |
| 2019/0215819 A1* | 7/2019 | Tang | H04W 72/0406 |
| 2019/0239264 A1* | 8/2019 | Hahn | H04W 4/40 |
| 2019/0306911 A1* | 10/2019 | Hahn | H04W 76/14 |
| 2020/0059914 A1* | 2/2020 | Akoum | H04W 72/042 |
| 2020/0236667 A1* | 7/2020 | Kwak | H04W 4/40 |

FOREIGN PATENT DOCUMENTS

| | | |
|---|---|---|
| WO | 2017/026511 | 2/2017 |
| WO | WO2018203669 | 11/2018 |

OTHER PUBLICATIONS

InterDigital Inc., "On Physical Layer Structure Design," R1-1813226, 3GPP TSG RAN WG1 Meeting #95, Spokane, USA, dated Nov. 12-16, 2018, 8 pages.

Nokia, Nokia Shanghai Bell, "Discussions on NR V2X Sidelink Physical Layer Structures," R1-1901155, 3GPP TSG RAN WG1 Meeting AH-1901, Taipei, Taiwan, dated Jan. 21-25, 2019, 14 pages.

KR Office Action in Korean Appln. No. 2020-7004476, dated Apr. 27, 2020, 11 pages (with English Translation).

\* cited by examiner

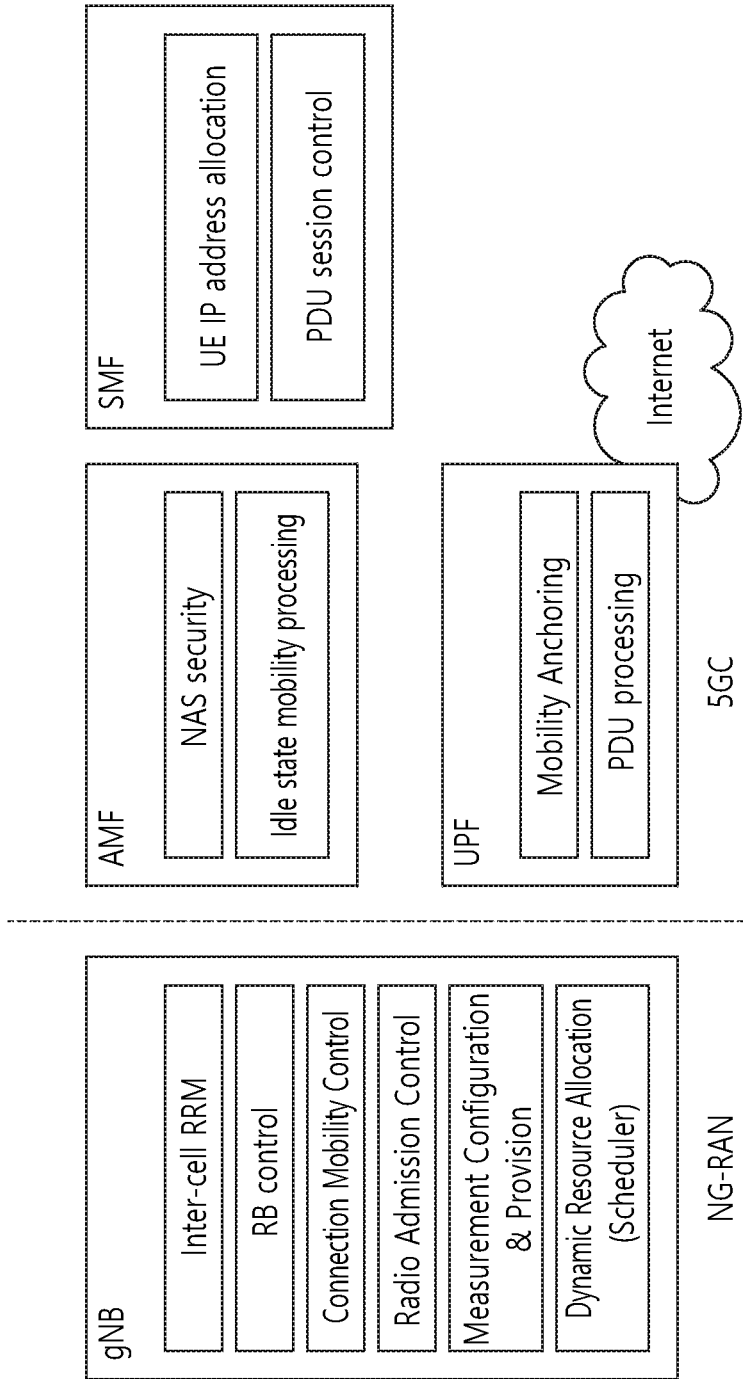

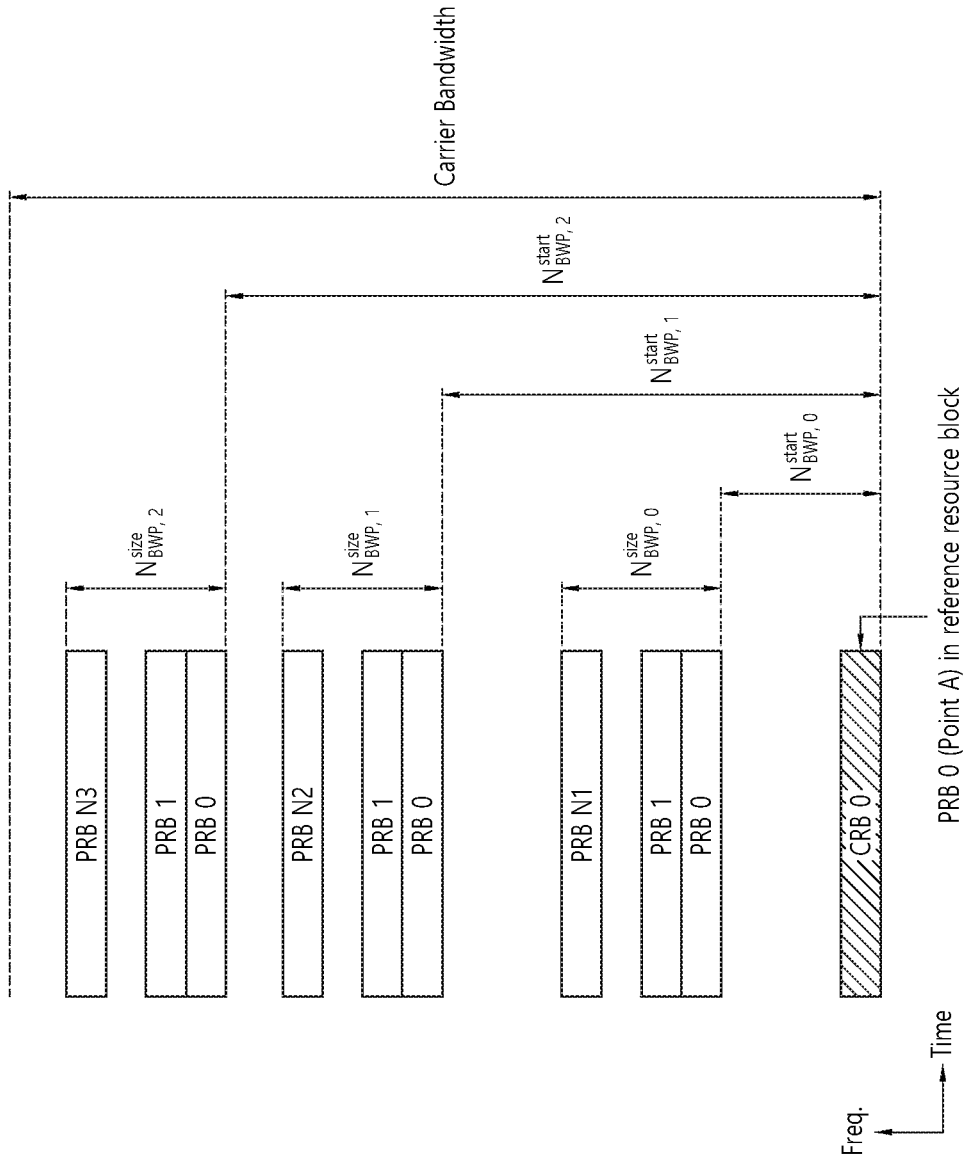

US 10,880,910 B2

2-STEP SCI TRANSMISSION OF NR V2X

CROSS-REFERENCE TO RELATED APPLICATIONS

Pursuant to 35 U.S.C. § 119(e), this application is a continuation of International Application No. PCT/KR2020/001229, with an international filing date of Jan. 23, 2020, which claims the benefit of U.S. Provisional Patent Application No. 62/795,597, filed on Jan. 23, 2019. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as BSM (Basic Safety Message), CAM (Cooperative Awareness Message), and DENM (Decentralized Environmental Notification Message) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

The present disclosure provides a method for communication between apparatuses (or terminals) based on V2X communication, and the apparatuses (or terminals) performing the method.

The present disclosure also provides a method of transmitting and receiving a sidelink control information (SCI) between apparatuses based on V2X communication in a wireless communication system, and the apparatus performing the method.

Different SCIs may be required in a communication system according to a transmission type (e.g., broadcast, groupcast, unicast, etc.) and/or a traffic feature or the like. In this case, the different SCIs may be expressed based on different SCI formats. When the SCI is defined (or determined) based on the different SCI format, in order to decode the SCI, an apparatus (or terminal) may have to perform blind decoding several times by considering a size of SCI based on each SCI format. Accordingly, unnecessary latency and/or power consumption may occur. Therefore, in order to minimize the occurrence of the unnecessary latency and/or power consumption, the SCI format needs to be effectively defined. In this regard, the present disclosure also provides a method of effectively defining (or determining) a format of SCI required in each environment (e.g., a transmission type, a traffic feature, etc.) by considering power consumption or latency or the like of an apparatus (or terminal) when SL communication is performed in a V2X system, and the apparatus performing the method.

The present disclosure also provides a method and apparatus for effectively defining a first SCI including information for a resource of a second SCI while performing SCI transmission in 2 steps through the first SCI and the second SCI.

According to an embodiment of the present disclosure, there is provided a method for performing sidelink (SL) communication by a first apparatus. The method includes transmitting a first sidelink control information (SCI) to a second apparatus through physical sidelink control channel (PSCCH), and transmitting a second SCI to the second apparatus through physical sidelink shared channel (PSSCH) related to the PSCCH. The first SCI includes information for a resource of the second SCI.

According to another embodiment of the present disclosure, there is provided a first apparatus for performing SL communication. The first apparatus includes at least one memory storing instructions, at least one transceiver, and at least one processor coupling the at least one memory and the at least one transceiver. The at least one processor is configured to control the at least one transceiver to transmit a first SCI to a second apparatus through a PSCCH, and control the at least one transceiver to transmit a second SCI to the second apparatus through a PSSCH related to the PSCCH. The first SCI includes information for a resource of the second SCI.

According to another embodiment of the present disclosure, there is provided an apparatus controlling a first apparatus. The apparatus includes at least one processor, and at least one computer memory coupled by the at least one processor in an executable manner and storing instructions. The at least one processor executes the instructions, so that the first terminal is configured to transmit a first SCI to a second apparatus through a PSCCH, and transmit a second SCI to the second apparatus through a PSSCH related to the PSCCH. The first SCI includes information for a resource of the second SCI.

According to another embodiment of the present disclosure, there is provided a non-transitory computer readable storage medium storing instructions. The instructions are executed by at least one processor to transmit, by a first apparatus, a first SCI to a second apparatus through a PSCCH, and transmit, by the first apparatus, a SCI to the second apparatus through a PSSCH related to the PSCCH. The first SCI includes information for a resource for the second SCI.

According to another embodiment of the present disclosure, there is provided a method of performing SL communication by a second apparatus. The method includes receiving a first SCI from a first apparatus through a PSCCH, and receiving a second SCI from the first apparatus through a PSSCH related to the PSCCH. The first SCI includes information for a resource of the second SCI.

According to another embodiment of the present disclosure, there is provided a second apparatus for performing SL communication. The second apparatus includes at least one memory storing instructions, at least one transceiver, and at least one processor coupling the at least one memory and the at least one transceiver. The at least one processor is configured to control the at least one transceiver to receive a first SCI from a first apparatus through a PSCCH, and control the at least one transceiver to receive a second SCI from the first apparatus through a PSSCH related to the PSCCH. The first SCI includes information for a resource of the second SCI.

According to the present disclosure, a terminal (or apparatus) can effectively perform SL communication.

According to the present disclosure, V2X communication between apparatuses (or terminals) can be effectively performed.

According to the present disclosure, apparatuses based on V2X communication in a wireless communication system can transmit and receive SCI in an effective manner.

According to the present disclosure, when SL communication is performed in a V2X system, a format of control information required in each environment (e.g., a transmission type, a traffic feature, etc.) can be effectively defined (or determined) by considering power consumption, latency, or the like of an apparatus (or terminal).

According to the present disclosure, a first SCI including information for a resource of a second SCI can be effectively defined when performing SCI transmission in 2 steps through the first SCI and the second SCI.

BRIEF DESCRIPTION OF THE DRAWINGS

FIG. 3 shows a functional division between an NG-RAN and a 5GC, in accordance with an embodiment of the present disclosure.

FIG. 7 shows an example of a BWP, in accordance with an embodiment of the present disclosure.

BEST MODE FOR CARRYING OUT THE DISCLOSURE

Figure 1:
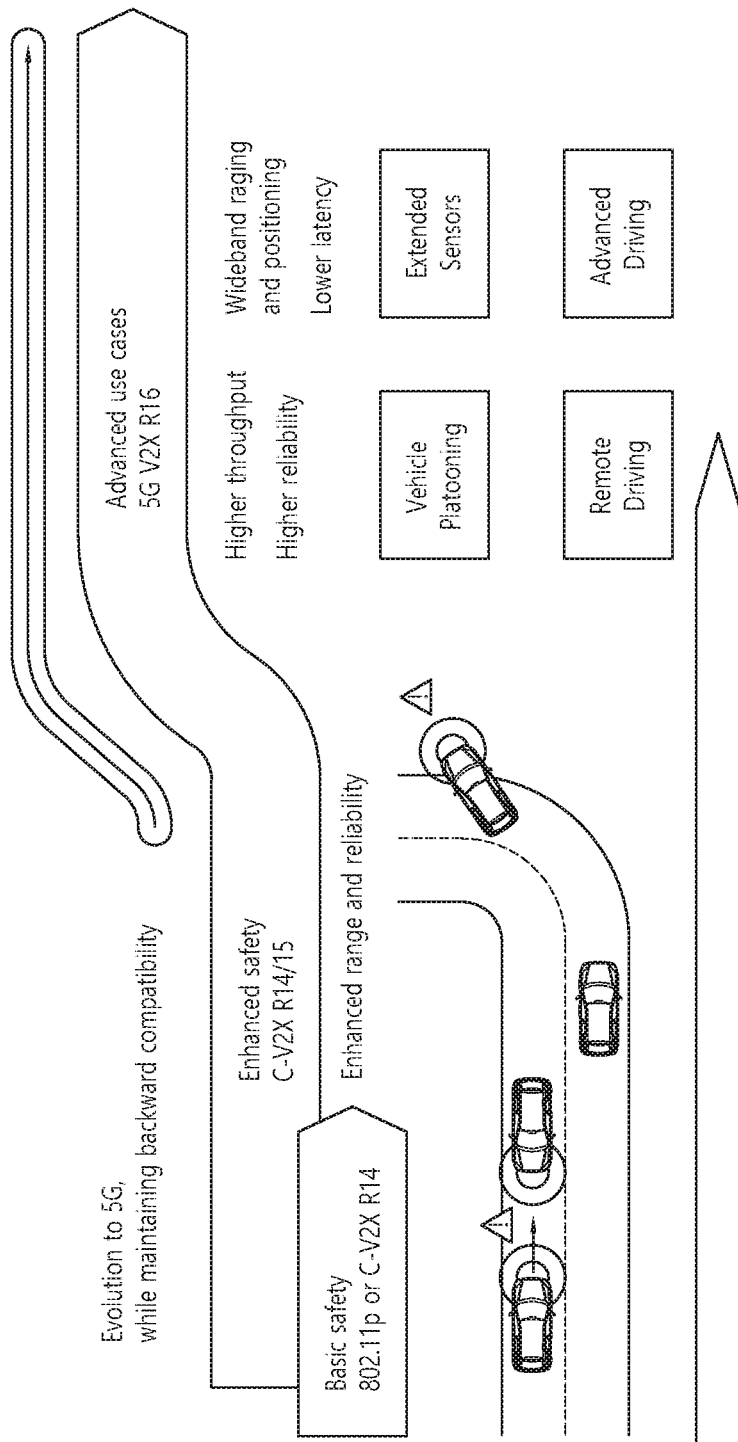
FIG. 1 is a drawing for describing V2X communication based on NR, compared to V2X communication based on RAT used before NR.

According to an embodiment of the present disclosure, there is provided a method for performing sidelink (SL) communication by a first apparatus. The method includes transmitting a first sidelink control information (SCI) to a second apparatus through physical sidelink control channel (PSCCH), and transmitting a second SCI to the second apparatus through physical sidelink shared channel (PSSCH) related to the PSCCH. The first SCI includes information for a resource of the second SCI.

DESCRIPTION OF EXEMPLARY EMBODIMENTS

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
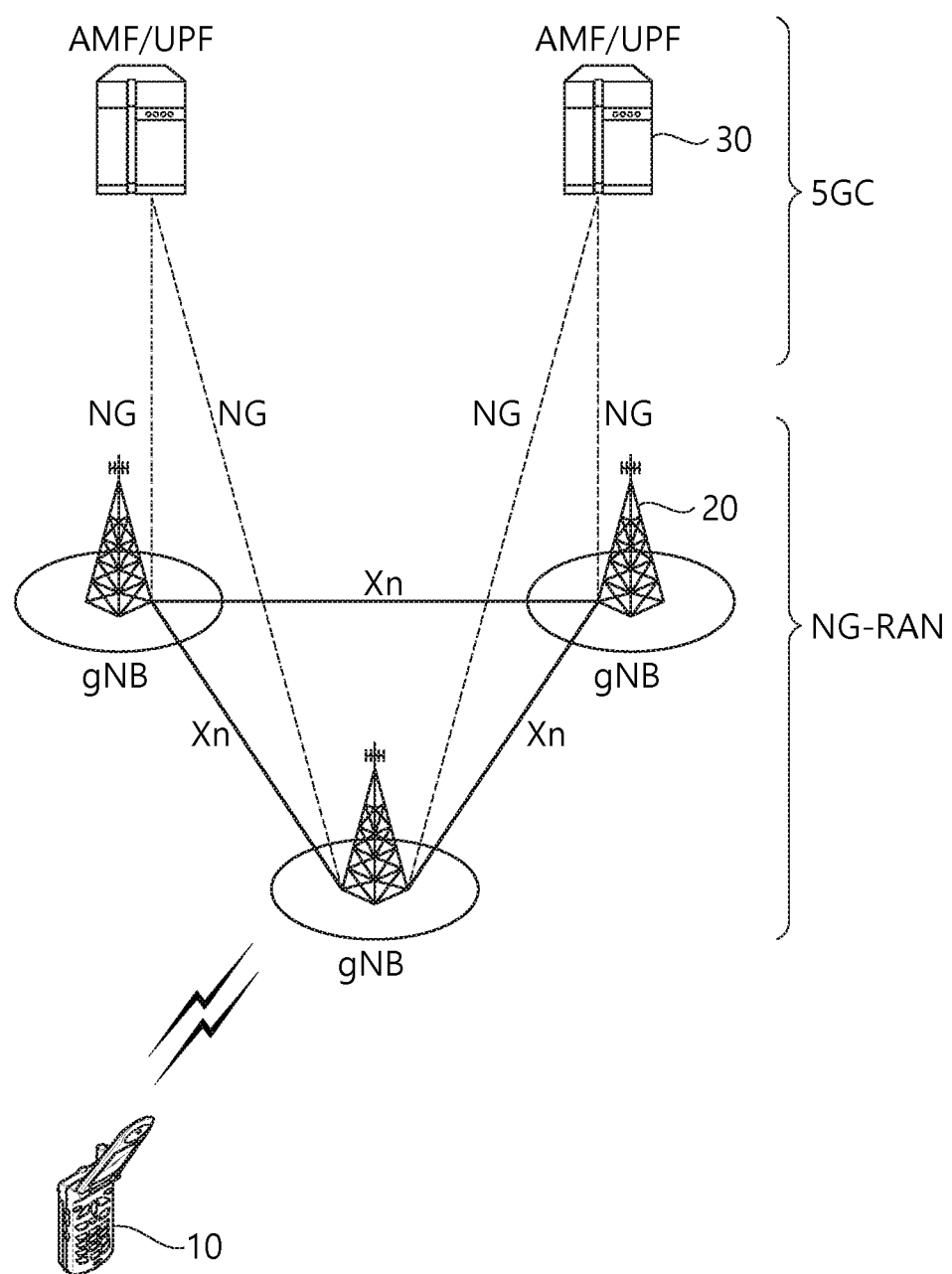
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
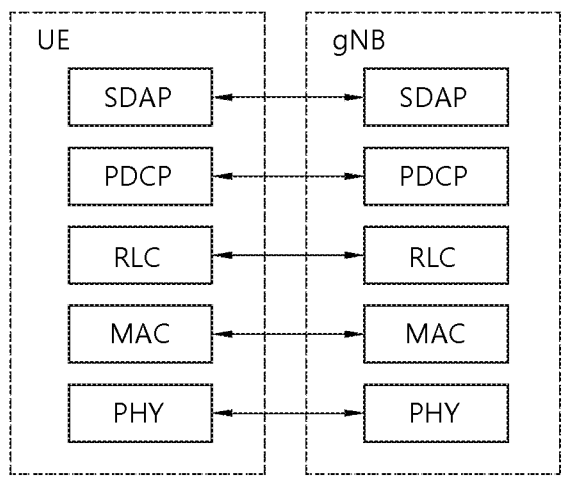
FIGS. 4A and 4B show a radio protocol architecture, in accordance with an embodiment of the present disclosure.
Figure 4B:
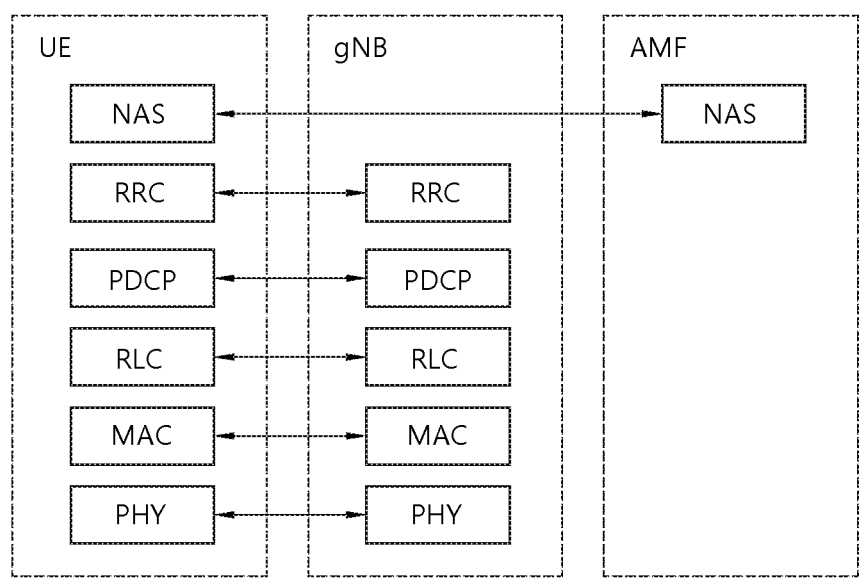

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC CONNECTED state, and, otherwise, the UE may be in an RRC IDLE state. In case of the NR, an RRC INACTIVE state is additionally defined, and a UE being in the RRC INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
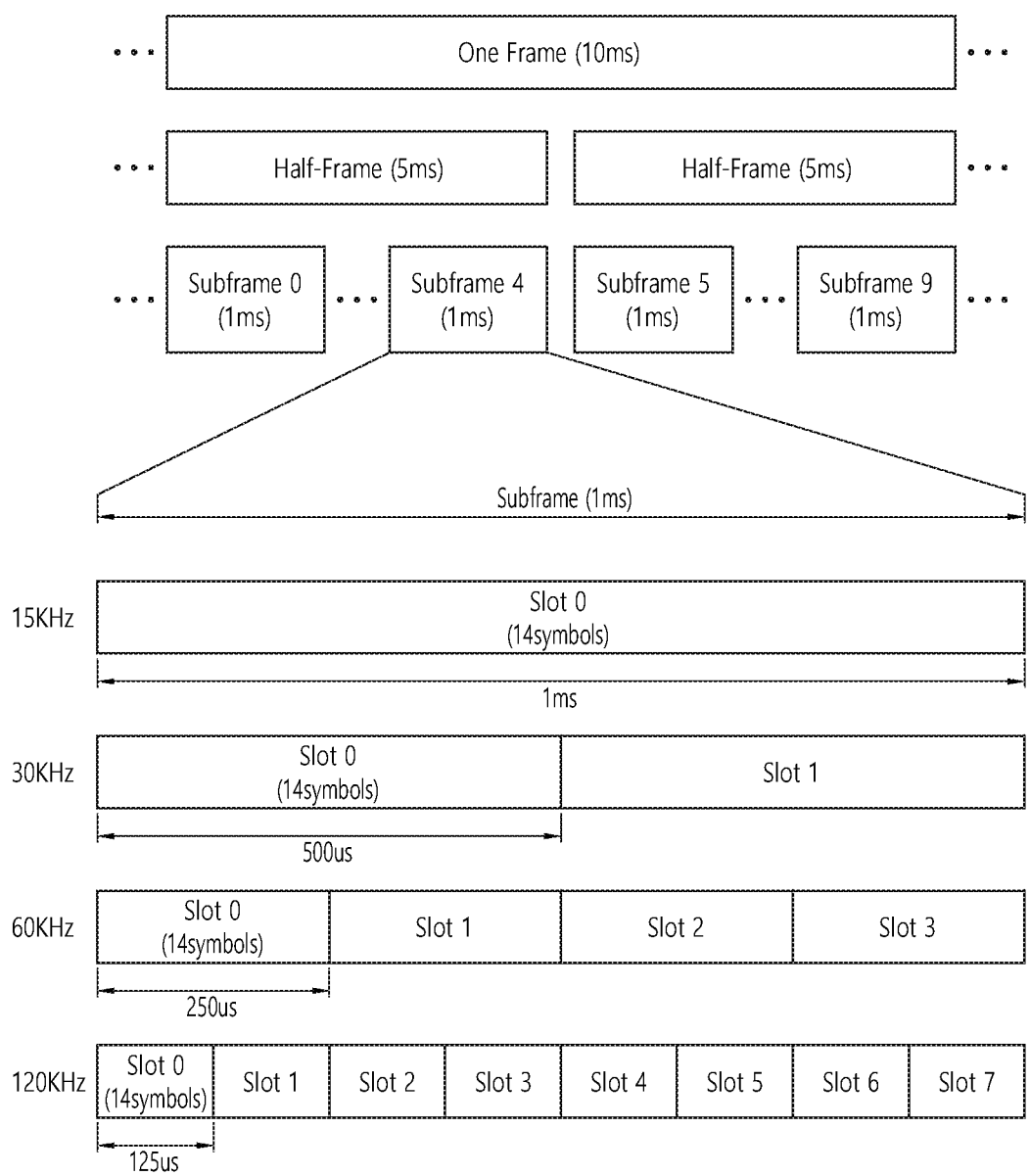
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame, u}_{slot}$ | $N^{subframe, u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame, u}_{slot}$ | $N^{subframe, u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
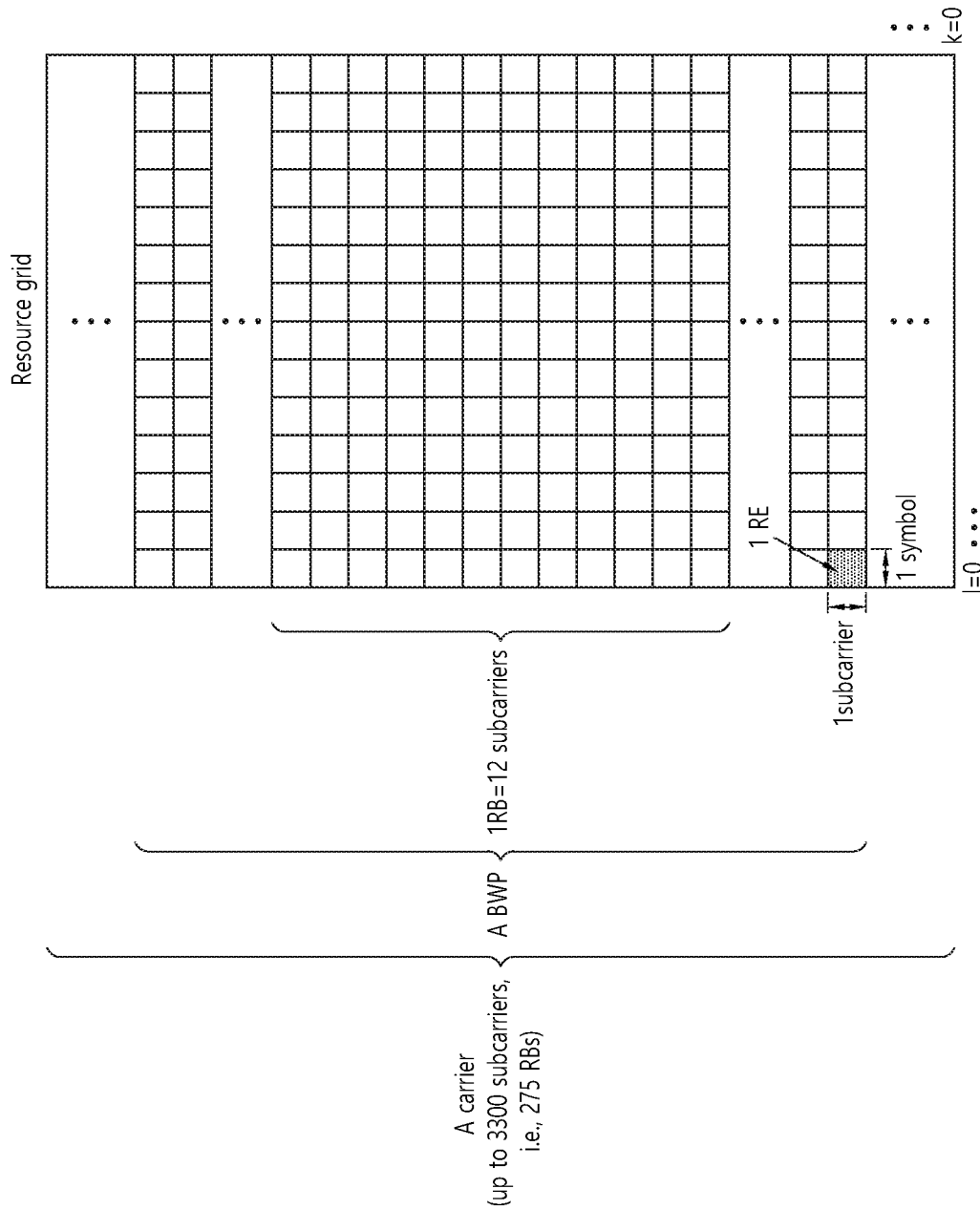
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC IDLE UE. For the UE in the RRC CONNECTED mode, at least one SL BWP may be activated in the carrier.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
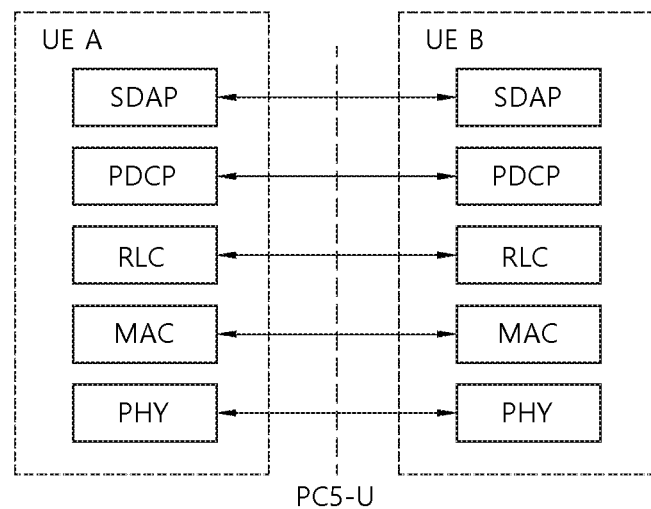
FIGS. 8A and 8B show a radio protocol architecture for a SL communication, in accordance with an embodiment of the present disclosure.
Figure 8B:
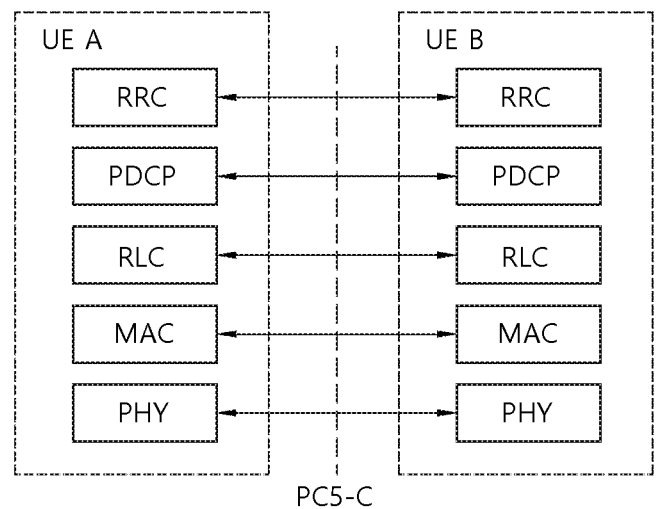

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
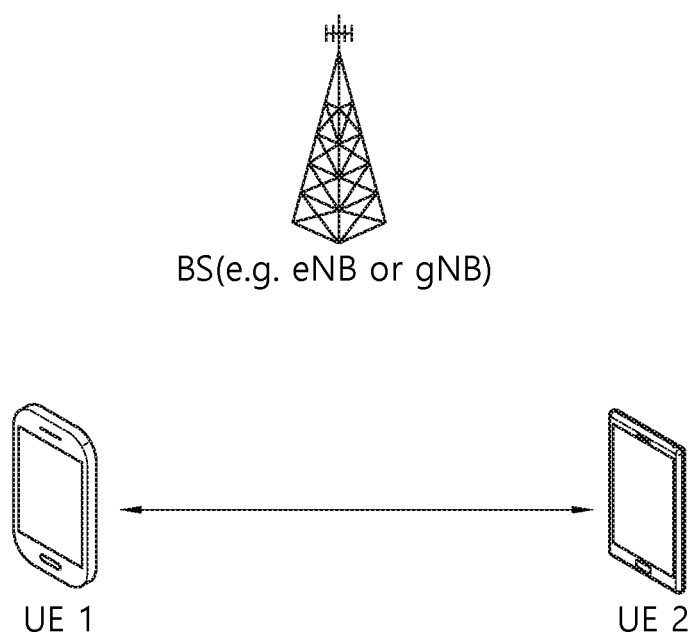
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
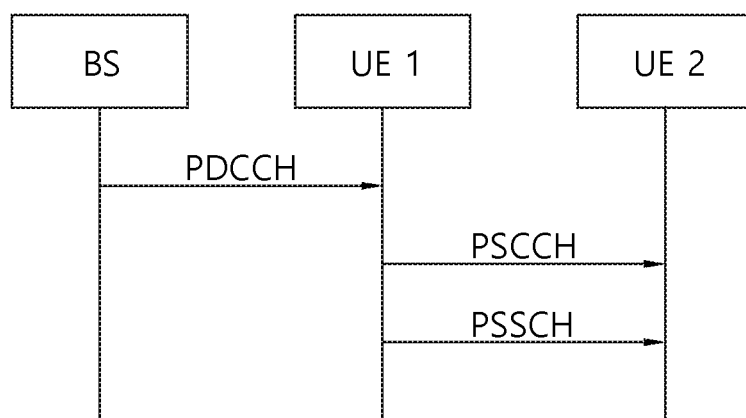
FIGS. 10A and 10B show a procedure of performing V2X or SL communication by a UE based on a transmission mode, in accordance with an embodiment of the present disclosure.
Figure 10B:
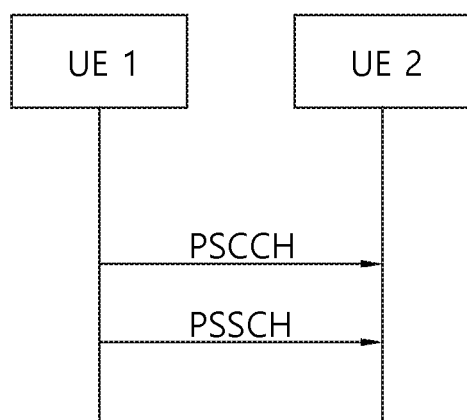

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
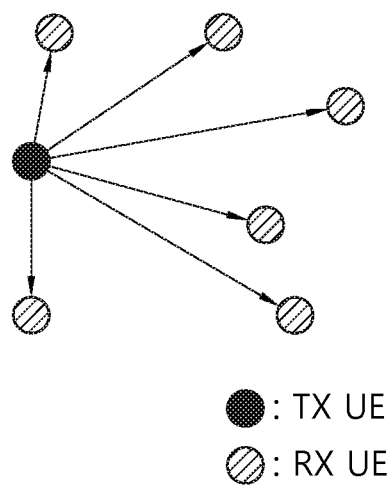
FIGS. 11A to 11C show three cast types, in accordance with an embodiment of the present disclosure.
Figure 11B:
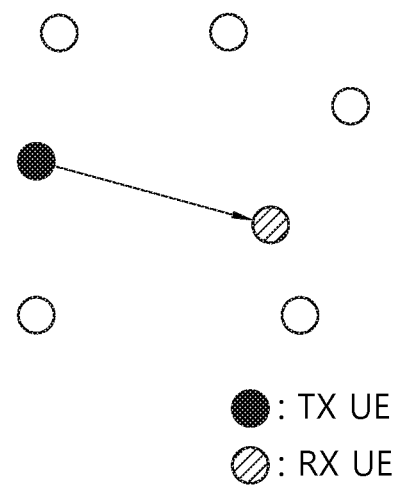
Figure 11C:
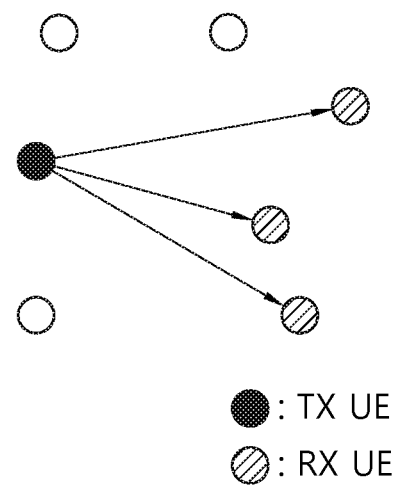

FIGS. 11A to 11C show three cast types, in accordance with an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in sidelink communication, a UE may need to effectively select a resource for sidelink transmission. Hereinafter, a method in which a UE effectively selects a resource for sidelink transmission and an apparatus supporting the method will be described according to various embodiments of the present disclosure. In various embodiments of the present disclosure, the sidelink communication may include V2X communication.

At least one scheme proposed according to various embodiments of the present disclosure may be applied to at least any one of unicast communication, groupcast communication, and/or broadcast communication.

At least one method proposed according to various embodiment of the present embodiment may apply not only to sidelink communication or V2X communication based on a PC5 interface or an SL interface (e.g., PSCCH, PSSCH, PSBCH, PSSS/SSSS, etc.) or V2X communication but also to sidelink communication or V2X communication based on a Uu interface (e.g., PUSCH, PDSCH, PDCCH, PUCCH, etc.).

In various embodiments of the present disclosure, a receiving operation of a UE may include a decoding operation and/or receiving operation of a sidelink channel and/or sidelink signal (e.g., PSCCH, PSSCH, PSFCH, PSBCH, PSSS/SSSS, etc.). The receiving operation of the UE may include a decoding operation and/or receiving operation of a WAN DL channel and/or a WAN DL signal (e.g., PDCCH, PDSCH, PSS/SSS, etc.). The receiving operation of the UE may include a sensing operation and/or a CBR measurement operation. In various embodiments of the present disclosure, the sensing operation of the UE may include a PSSCH-RSRP measurement operation based on a PSSCH DM-RS sequence, a PSSCH-RSRP measurement operation based on a PSSCH DM-RS sequence scheduled by a PSCCH successfully decoded by the UE, a sidelink RSSU (S-RSSI) measurement operation, and an S-RSSI measurement operation based on a V2X resource pool related subchannel. In various embodiments of the disclosure, a transmitting operation of the UE may include a transmitting operation of a sidelink channel and/or a sidelink signal (e.g., PSCCH, PSSCH, PSFCH, PSBCH, PSSS/SSSS. etc.). The transmitting operation of the UE may include a transmitting operation of a WAN UL channel and/or a WAN UL signal (e.g., PUSCH, PUCCH, SRS, etc.). In various embodiments of the present disclosure, a synchronization signal may include SLSS and/or PSBCH.

In various embodiments of the present disclosure, a configuration may include signaling, signaling from a network, a configuration from the network, and/or a pre-configuration from the network. In various embodiments of the present disclosure, a definition may include signaling, signaling from a network, a configuration form the network, and/or a pre-configuration from the network. In various embodiment of the present disclosure, a designation may include signaling, signaling from a network, a configuration from the network, and/or a pre-configuration from the network.

In various embodiments of the present disclosure, a ProSe per packet priority (PPPP) may be replaced with a ProSe per packet reliability (PPPR), and the PPPR may be replaced with the PPPP. For example, it may mean that the smaller the PPPP value, the higher the priority, and that the greater the PPPP value, the lower the priority. For example, it may mean that the smaller the PPPR value, the higher the reliability, and that the greater the PPPR value, the lower the reliability. For example, a PPPP value related to a service, packet, or message related to a high priority may be smaller than a PPPP value related to a service, packet, or message related to a low priority. For example, a PPPR value related to a service, packet, or message related to a high reliability may be smaller than a PPPR value related to a service, packet, or message related to a low reliability In various embodiments of the present disclosure, a session may include at least any one of a unicast session (e.g., unicast session for sidelink), a groupcast/multicast session (e.g., groupcast/multicast session for sidelink), and/or a broadcast session (e.g., broadcast session for sidelink).

In various embodiments of the present disclosure, a carrier may be interpreted as at least any one of a BWP and/or a resource pool. For example, the carrier may include at least any one of the BWP and/or the resource pool. For example, the carrier may include one or more BWPs. For example, the BWP may include one or more resource pools.

In a V2X system, a transmission scheme (e.g., an MIMO operation, whether HARQ-ACK/NACK feedback is performed, whether closed-loop TPC is performed, an MCS table type, etc.) may be different according to a transmission type (e.g., broadcast, groupcast, and/or unicast), channel environment, and/or traffic feature or the like of a sidelink or a Uu link. Accordingly, a combination of a field constituting control information and/or a size of each field may be different. The control information based on a combination of different fields and/or a size of each field may be represented based on a control information format. In this case, in order to adjust a payload size equally between different control information formats, the control information format may be defined by including at least one padding bit and/or at least one reserved bit. Alternatively, the control information format may be defined without including the padding bit and/or the reserved bit. In a V2X system, a transmission scheme (e.g., an MIMO operation, whether HARQ-ACK/NACK feedback is performed, whether closed-loop TPC is performed, an MCS table type, etc.) may be different according to a transmission type (e.g., broadcast, groupcast, and/or unicast), channel environment, and/or traffic feature or the like of a sidelink or a Uu link. Accordingly, a combination of a field constituting sidelink control information (SCI) (or control information) and/or a size of each field may be different. The SCI based on a combination of different fields and/or a size of each field may be represented based on an SCI format (or a control information format). In this case, in order to adjust a payload size equally between different SCI formats, the SCI format may be defined by including at least one padding bit and/or at least one reserved bit. Alternatively, the SCI format may be defined without including the padding bit and/or the reserved bit.

If a plurality of SCI formats are defined and if a payload size is different for each of the plurality of SCI formats, a UE may have to perform blind decoding with respect to each payload size. Accordingly, additional latency may be required, and power may be additionally consumed. In particular, in case of an RRC idle UE or an out-of-coverage UE, monitoring (i.e., blind decoding) may be performed for a (pre)configured SCI format. In this case, if different SCI formats have to be monitored in various resource pools or time axis/frequency axis resources by considering scheduling flexibility, the number of times of performing blind decoding may be increased. In this case, if a resource usage is limited for the purpose of decreasing decoding complexity, scheduling flexibility may be decreased, and when sensing-based sidelink transmission is performed, transmission efficiency may be decreased (due to a collision and interference between different transmissions).

Accordingly, in order to solve the aforementioned problem, a method of equally adjusting a size for each SCI format may be considered in an embodiment when a plurality of SCI formats are defined in an embodiment. In other words, although a field may be configured differently for each of the defined plurality of SCI formats, at least one padding bit and/or reserved bit may be used so that a size (or payload size) is identical between the SCI formats. In this case, in order to indicate a field constituting each SCI format, a format indicator may be added in the field, and a position of the field may be constant irrespective of a field configuration of each control information format. In a method of adding the at least one padding bit or reserved bit, a payload size of the SCI format may be configured based on a case where all types of fields that can be defined in the SCI format are enabled. If a specific field in the SCI format is disabled, it may be assumed that a value corresponding to the field is 0 or 1, or the value may be ignored even if a specific value is transmitted.

Whether the field is enabled/disabled may be distinguished based on a bit value of the format indicator. Alternatively, a payload size of an SCI format may be configured on the basis of an SCI format configured to have the greatest size among field combinations of the SCI format. For the remaining SCI formats other than the SCI format configured to have the greatest size, a most significant bit (MSB) or least significant bit (LSB) of SCI may be added, or a padding bit may be added between a bit for the format indicator and actual SCI. In this case, even if the SCI formats have different field configurations, a position (e.g., a resource allocation field required for sensing or a DMRS pattern indication field or the like) of information that can be utilized by other UEs may be fixed according to a characteristic of sidelink transmission.

In another embodiment, the SCI format or the (payload) size may be determined according to a search space for detecting the SCI format. Alternatively, a control channel region in which a corresponding SCI format is transmitted may be distinguished according to the (payload) size of the SCI format.

In another embodiment, when at least one padding bit or at least one reserved bit is used to equally adjust a size between different SCI formats, which format is used to transmit corresponding SCI (i.e., which combination of fields is used to configure the SCI) may be indicated through an operation of scrambling a specific sequence to CRC instead of a separate indication bit field.

In another embodiment, an initialization ID applied in DMRS sequence generation may be applied differently for each SCI format. Alternatively, a maximum payload size or an SCI format may be determined in a pool-specific manner, and an operation of equally adjusting (the payload size) may be performed in a pool-specific manner. In other words, a size of each SCI format may be equally adjusted according to a maximum payload size allowed in a specific pool or an SCI format corresponding to the maximum payload size, and this scheme may be pre-defined in a system.

In another embodiment, a UE may (pre-)configure a maximum payload size that can be allowed in a pool specific manner or an SCI format corresponding to the maximum payload size on the basis of information signaled from a BS, and may equally adjust a size of each SCI format according to the SCI format.

In another embodiment, based on the fact that required reliability or the like is different for each service, the SCI format may be defined in a service-specific manner or the SCI format may be defined according to a priority of transmission information. In an example, according to a requirement required for a specific service, a resource allocation unit (e.g., subchannel) applied in data transmission may be defined differently to decrease the payload size of the SCI, and the (payload) size of the SCI format may be determined according to the resource allocation unit. Alternatively, the SCI format may be defined according to a channel busy ratio (CBR) level. For example, it may be defined such that an SCI format consisting of more compact information (or smaller sized SCI) is used at a higher congestion level. In this case, an operation of equally adjusting a (payload) size between one or more SCI formats defined according to the priority of the transmission information and/or the congestion level may be applied, and a specific operation for equally adjusting the payload size may be identical/similar to the aforementioned embodiments.

As in the aforementioned embodiment, if at least one padding bit or at least one reserved bit is added to a specific SCI format to equally adjust a size between the SCI formats, corresponding bits may be transmitted based on a predefined value (e.g., 0 or 1) and utilized as virtual CRS, or may be used as a field for transmitting additional information. The additional information may include, for example, information which is useful for a sensing operation (e.g., information regarding whether data transmission associated with corresponding SCI is periodic transmission or aperiodic transmission, information regarding the number of reserved resources when the data transmission is the periodic transmission, or the like).

Meanwhile, specified embodiments for implementing the aforementioned format indicator will be described below with reference to FIG. 12.

Figure 12:
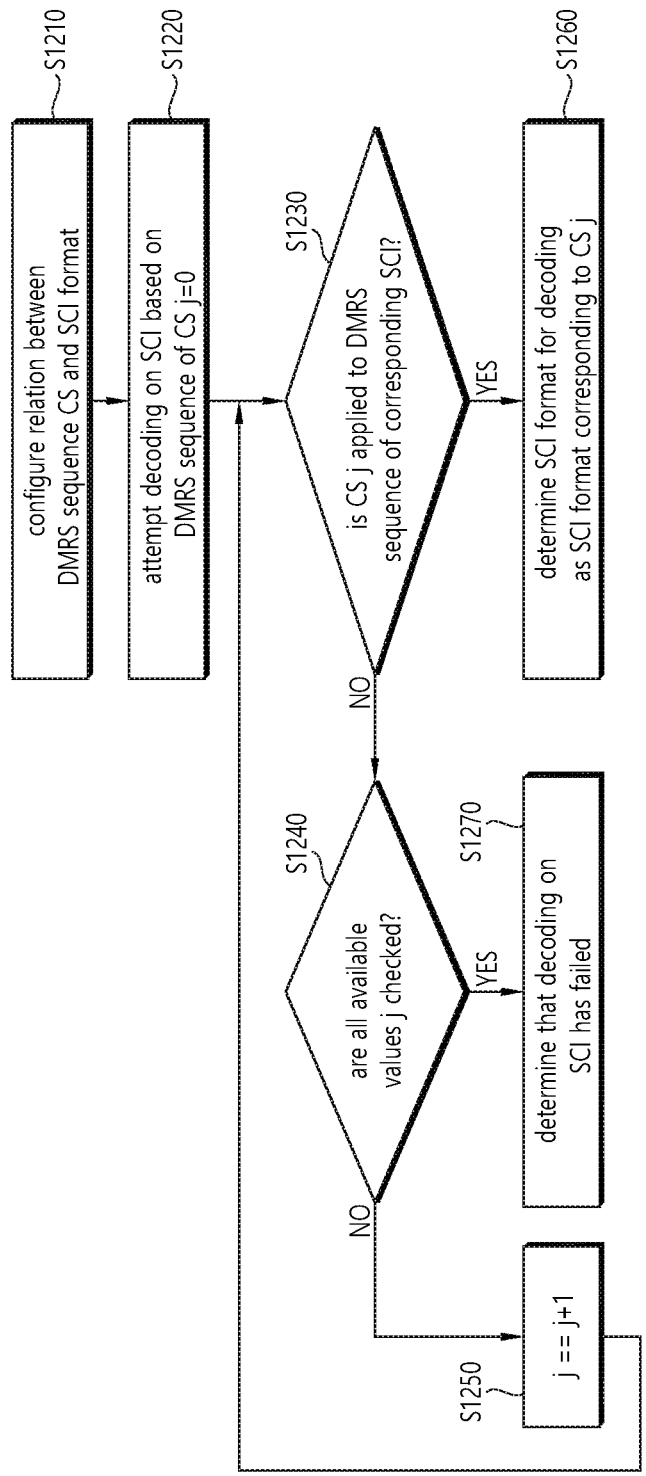
FIG. 12 shows a method of determining a control information format based on a format indicator, in accordance with an embodiment of the present disclosure.

FIG. 12 shows a method of determining a control information format on the basis of a format indicator, in accordance with an embodiment of the present disclosure.

In an embodiment, a format indicator may be referred to (or indicated) as header information. The format indicator or the header information may be defined as an additional field in an SCI format, or may be indicated in an indirect (or implicit) manner. In an example, the format indicator or the header information may be indicated in such a manner that a modulation symbol is multiplied by DMRS. In another example, the format indicator or the header information may be indicated by differently transmitting a sequence of the DMRS (e.g., cyclic shift (CS) value).

As in the aforementioned embodiment, when a (payload) size or an SCI format is determined indirectly (or implicitly) based on sequence detection by using the CS of the DMRS or by using a modulation symbol, the number of blind decoding attempts of an apparatus (or UE) may be decreased. A relation between the SCI format and the modulation symbol or the CS value of the sequence may be (pre-)defined in a system, or may be configured by transferring related information from a BS to a UE through higher layer signaling and/or physical layer signaling.

Referring to FIG. 12, an example of a method in which an apparatus (or UE) determines a (payload) size or an SCI format on the basis of a CS of a DMRS is illustrated. The apparatus according to an embodiment may (pre-)configure a relation between a CMRS sequence CS and an SCI format in step S1210. In step S1220, the apparatus may attempt decoding on SCI on the basis of a DMRS sequence of CS j=0. In step S1230, the apparatus may decide (or determine) whether CS j=0 is applied to a DRMS sequence of corresponding SCI. Based on the determination that CS j=0 is not applied to the DMRS sequence of the corresponding SCI, in step S1240, the apparatus may decide whether all available values j are checked. Based on the determination that all available values j are not checked, 1 may be added to j=0, resulting in j=1. Returning to step S1230, the apparatus may decide (or determine) whether CS j=1 is applied to the DMRS sequence of the corresponding SCI. The aforementioned steps S1230 to S1250 may be repeated in sequence, so that the CS j is checked in an orderly manner while incrementing j by 1 starting from 0. If it is decided in step S1230 that the CS j is applied to the DMRS sequence of the corresponding SCI, proceeding to step S1260, the apparatus may determine an SCI format for decoding as an SCI format corresponding to the CS j. Meanwhile, although all available values CS j are checked while incrementing j by 1 starting from 0, if the CS j applied to the DMRS sequence of the corresponding SCI cannot be detected, proceeding to step S1270, the apparatus may decide (or determine) that decoding on the SCI has failed.

Figure 13:
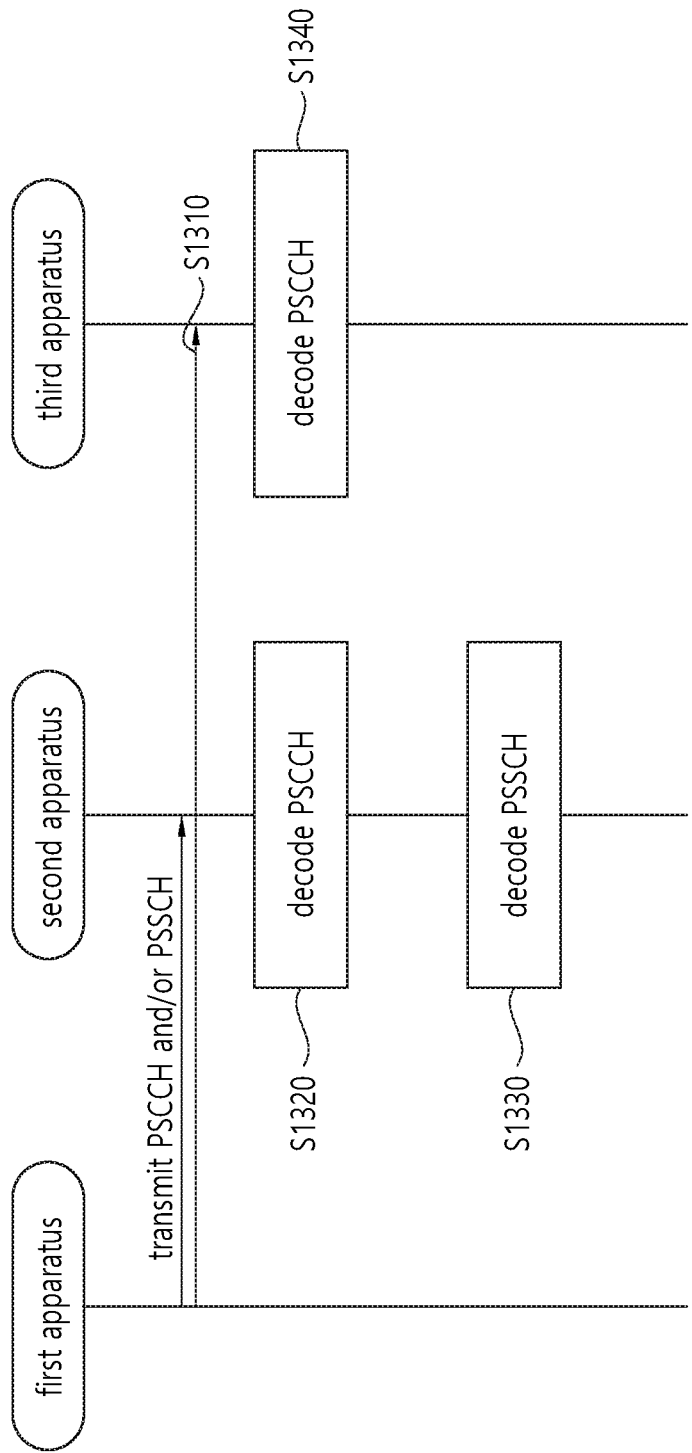
FIG. 13 shows a sidelink communication method between a plurality of apparatuses, in accordance with an embodiment of the present disclosure.

FIG. 13 shows a sidelink communication method between a plurality of apparatuses, in accordance with an embodiment of the present disclosure. More specifically, FIG. 13 shows an example of a method in which an apparatus (the first apparatus of FIG. 13) transmits SCI to external apparatuses (the second apparatus and/or third apparatus of FIG. 13) in a 2-stage manner.

In the present disclosure, "2-step SCI transmission" may be replaced with various terms such as 2-step transmission, 2-stage transmission, 2-stage SCI transmission, or the like. In the 2-step SCI transmission, "first SCI" transmitted first may be replaced with various terms such as first sidelink control information, first control information, or the like, and "second SCI" transmitted later may be replaced with various terms such as second sidelink control information, second control information, or the like. The first SCI may include information for the second SCI. In addition, the "SCI format" may be replaced with various terms such as a control information format, a sidelink control information format, or the like.

In the present disclosure, between two apparatuses (or terminals) performing SL communication, an apparatus for first transmitting a physical sidelink shared channel (PSSCH) and/or a physical sidelink control channel (PSCCH) is referred to as a "first apparatus", and an apparatus for receiving the PSSCH and/or the PSCCH is referred to as a "second apparatus" and/or a "third apparatus". In the present disclosure, the first apparatus may be replaced with various terms such as a transferring terminal, a transmitting terminal, a transmitting apparatus, a TX UE, a transmitting UE, a transferring UE, a transmitter UE, a UE, or the like, and the second apparatus and/or the third apparatus may be replaced with various terms such as a receiving terminal, an RX UE, a receiving UE, a receiver UE, a UE, or the like.

More specifically, the second apparatus may be referred to as a "target apparatus" representing an apparatus (or terminal) which is a target of the second SCI, and the third apparatus may be referred to as a "non-target apparatus" representing an apparatus (or terminal) which is not the target of the second SCI.

In addition, since the 'first apparatus' and the 'second apparatus and/or third apparatus' are classified according whether the PSSCH and/or the PSCCH are transmitted or received, the 'first apparatus' can be switched to the 'second apparatus and/or third apparatus', and the 'second apparatus and/or third apparatus' can be switched to the 'first apparatus', which will be easily understood by those ordinarily skilled in the art.

The first apparatus according to an embodiment may transmit the PSCCH and/or the PSSCH to the second apparatus and/or the third apparatus in step S1310. In this case, the PSCCH and/or the PSSCH may be transmitted from the first apparatus to the second apparatus and/or the third apparatus based on unicast-type SL communication, groupcast-type SL communication, and/or broadcast-type SL communication described above with reference to FIGS. 11A to 11C.

The second apparatus (target apparatus) according to an embodiment may decode the PSCCH in step S1320, and may decode the PSSCH in step S1330. In an example, the second apparatus (target apparatus) may decode the first SCI transmitted through the PSCCH, may decode the second SCI transmitted through the PSSCH on the basis of a decoding result on the first SCI, and may determine to decode the PSSCH on the basis of a decoding result on the first SCI and/or the second SCI.

The third apparatus (non-target apparatus) according to an embodiment may decode the PSCCH in step S1340. In this case, the third apparatus may be characterized in that the PSSCH is not decoded. In an example, the third apparatus (non-target apparatus) may decode the first SCI transmitted through the PSCCH, may decode the second SCI transmitted through the PSSCH on the basis of a decoding result on the first SCI, and may determine not to decode the PSSCH on the basis of a decoding result on the first SCI and/or the second SCI.

The followings are more detailed descriptions related to the first SCI and the second SCI.

In an example, information included in the first SCI may be exemplified as shown in Table 5 below.

TABLE 5

Agreements made in RAN1#99:
1st SCI includes at least
Priority (QoS value),
PSSCH resource assignment (frequency/time resource for PSSCH),
Resource reservation period (if enabled),
PSSCH DMRS pattern (if more than one patterns are (pre-)configured),
2nd SCI format (e.g. information on the size of 2nd SCI),
[2]-bit information on amount of resources for $2^{nd}$ SCI (e.g. beta offset or aggregation level)
Number of PSSCH DMRS port(s)
5-bit MCS
FFS on some part of destination ID In another example, information included in first SCI may be exemplified as shown in Table 6 below.

TABLE 6

8.3.1.1    SCI format 0-1
SCI format 0-1 is used for the scheduling of PSSCH and $2^{nd}$-stage-SCI on PSSCH
The following information is transmitted by means of the SCI format 0-1:
Priority – 3 bits as defined in subclause x.x.x of [6, TS 38.214].
Frequency resource assignment –

$$\left\lceil \log_2\left(\frac{N_{subChannel}^{SL}(N_{subChannel}^{SL}+1)}{2}\right)\right\rceil$$

bits when the value of the higher layer parameter maxNumResource is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter maxNumResource is configured to 3, as defined in subclause x.x.x of [6, TS 38.214].
Time resource assignment – 5 bits when the value of the higher layer parameter maxNumResource is configured to 2; otherwise 9 bits when the value of the higher layer parameter maxNumResource is configured to 3, as defined in subclause x.x.x of [6, TS 38.214].
Resource reservation period – $\lceil \log_2(N_{reservPeriod})\rceil$ bits as defined in subclause x.x.x of [6, TS 38.214], if higher parameter reserveResourceDifferentTB is configured; 0 bit otherwise.
DMRS pattern – [x] bits as defined in subclause x.x.x of [6, TS 38.214], if
more than one DMRS patterns are configured by higher layer parameter TimePatternPsschDmrs; 0 bit otherwise.
$2^{nd}$-stage SCI format – [x] bits as defined in subclause x.x.x of [6, TS 38.214].
Beta_offset indicator – [2] bits as defined in subclause x.x.x of [6, TS 38.214].
Number of DMRS port – 1 bit as defined in subclause x.x.x of [6, TS 38.214].
Modulation and coding scheme – 5 bits as defined in subclause x.x.x of [6, TS 38.214].
Reserved – [2-4] bits as determined by higher layer parameter [XXX], with value set to zero.

In another example, information included in first sidelink control information (1st SCI) may be exemplified as shown in Table 7 below.

TABLE 7

Agreements RAN1#99:
In the $1^{st}$ stage SCI, there are [2] reserved bits (for future compability) where a Rel-16 Tx UE shall set the bits to all zeros while a Rel-16 Rx UE does not make any assumption about these bits
all 16-bit L1 destination ID is indicated by $2^{nd}$ stage SCI
FFS whether or not the number of reserved bits can be further (pre)-configured The first SCI may be configured to be detectable by all apparatuses (or terminals) without distinction of the apparatuses (or terminals). In case of being configured to be detectable by all apparatuses without distinction of the apparatuses, it may facilitate not a target apparatus (or target terminal) which is a target of second SCI subsequent to the first SCI but a non-target apparatus to sense a resource being used by the target apparatus, based on information detected through the first SCI (to this end, for example, the first SCI may include time-axis/frequency-axis resource information used in sidelink transmission).

In this case, the target apparatus needs to receive (or decode) the second SCI after detecting the first SCI. To this end, the first SCI may include information for detecting the second SCI. In an example, the first SCI may include information (e.g., information on a payload size or information on a transmission mode) on an SCI format of the second SCI. In addition thereto, the first SCI may include a size of the second SCI, to-be-transmitted channel information, resource information, and/or code rate information (or code rating information) or the like.

In another example, in association with the aforementioned example, the first SCI may be transmitted by including an ID of a target apparatus or target group in a payload, and CRC scrambling may be performed based on the ID in the processing of the second SCI. When the first SCI includes a destination ID or information on a target apparatus which is a target of the second SCI, a payload size of the first SCI may be increased, but unnecessary decoding for the second SCI, performed by a non-target apparatus other than the target apparatus, can be prevented. Unlike this, when a destination ID or information on a target apparatus is included in the second SCI or is applied through CRC scrambling, a payload size of the first SCI may be decreased, but a non-target apparatus may have to unnecessarily perform decoding on the second SCI. The second SCI may include information for verifying specific first SCI to which the second SCI corresponds, and may include MIMO-related parameters, CBG transmission information (CBGTI), HARQ-ACK feedback-related information, or the like according to configuration information indicated in the first SCI.

Figure 14:
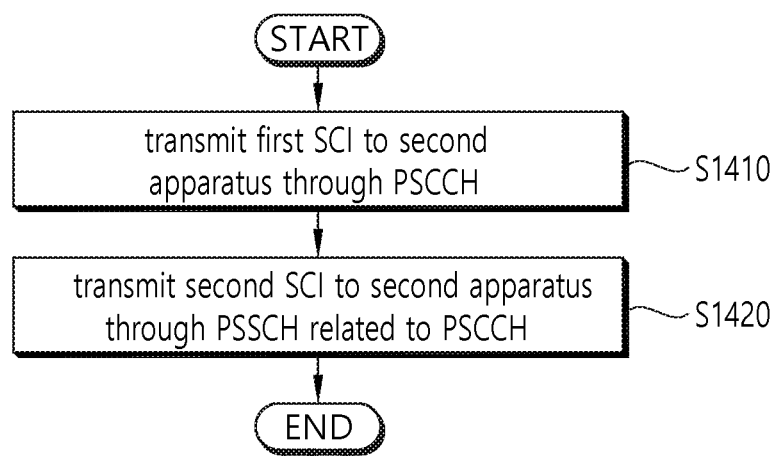
FIG. 14 is a flowchart illustrating an operation of a first apparatus, in accordance with an embodiment of the present disclosure.

FIG. 14 is a flowchart illustrating an operation of a first apparatus, in accordance with an embodiment of the present disclosure.

Operations disclosed in the flowchart of FIG. 14 may be performed in combination with various embodiments of the present disclosure. In an example, the operations disclosed in the flowchart of FIG. 14 may be performed based on at least one of apparatuses shown in FIG. 16 to FIG. 21. In another example, the operations disclosed in the flowchart of FIG. 14 may be performed by being combined in various manners with the operations disclosed in the flowchart of FIG. 13. In an example, a first apparatus of FIG. 14 may correspond to a first wireless device 100 of FIG. 17 described below. In another example, the first apparatus of FIG. 14 may correspond to a second wireless device 200 of FIG. 17 described below.

In step S1410, the first apparatus according to an embodiment may transmit a first sidelink control information (SCI) to a second apparatus through a physical sidelink control channel (PSCCH). In an example, the first control information may be transmitted through the PSCCH from the first apparatus to the second apparatus, based on SL communication of a broadcast type, SL communication of a unicast type, and/or SL communication of a groupcast type.

In step S1420, the first apparatus according to an embodiment may transmit a second SCI to the second apparatus through a physical sidelink shared channel (PSSCH) related to the PSCCH. In an example, the first control information may include information for the second control information.

In an embodiment, the first SCI may include information for a resource of the second SCI.

In an embodiment, the information for the resource of the second SCI may include information on the number of resource elements (REs) to which the second SCI is mapped and a coding rate, information on the number of REs to which the second SCI is mapped, or information on the coding rate.

In an embodiment, the information on the number of REs to which the second SCI and the coding rate is mapped may include information on a beta offset.

In an embodiment, the information on the beta offset may include a beta offset indicator for indicating the beta offset.

In an embodiment, the information for the resource of the second SCI may further include information on an aggregation level.

In an embodiment, the information for the resource of the second SCI may be expressed by 2 bits.

In an embodiment, the first SCI may include at least one of information on a time or frequency resource of the PSSCH, modulation and coding scheme (MCS) information required for decoding of the PSSCH, and priority information for data on the PSSCH.

In an embodiment, the second SCI may include at least one of information on a source ID or destination ID for data on the PSSCH, hybrid automatic repeat request (HARQ) process ID information, a new data indicator (NDI), and a redundancy version (RV).

In an embodiment, a resource region for transmitting the first SCI and a resource region for transmitting the second SCI may not overlap with each other. In an example, the first control information signaled in a resource for the PSCCH and the second control information signaled in a resource for the PSSCH may not overlap with each other.

In an embodiment, the PSSCH may be decoded by the second apparatus, based on a result of decoding performed on the first SCI and second information by the second apparatus. For example, the data on the PSSCH may be decoded by the second apparatus, based on a result of decoding performed on the first SCI and second SCI by the second apparatus. That is, the second apparatus may be determined as a target apparatus, based on a result of decoding performed on the first SCI and second SCI by the second apparatus.

In an embodiment, the first SCI may be transmitted to a third apparatus through the PSCCH, and the PSSCH may not be decoded by the third apparatus, based on a result of decoding result performed on the first SCI and second SCI by the third apparatus. For example, the first SCI may be transmitted to a third apparatus through the PSCCH, and data on the PSSCH may not be decoded by the third apparatus, based on a result of decoding performed on the first SCI and second SCI by the third apparatus. That is, the third apparatus may be determined as a non-target apparatus, based on a result of decoding performed on the first SCI and second SCI by the third apparatus.

According to an embodiment of the present disclosure, there may be provided a first apparatus for performing SL communication. The first apparatus may include at least one memory storing instructions, at least one transceiver, and at least one processor coupling the at least one memory and the at least one transceiver. The at least one processor may be configured to control the at least one transceiver to transmit a first SCI to a second apparatus through a PSCCH, and control the at least one transceiver to transmit a second SCI to the second apparatus through a PSSCH related to the PSCCH. The first SCI may include information for a resource of the second SCI.

According to an embodiment of the present disclosure, there may be provided an apparatus (or chip(set)) for controlling a first terminal. The apparatus may include at least one processor, and at least one computer memory coupled by the at least one processor in an executable manner and storing instructions. The at least one processor may execute the instructions, so that the first terminal is configured to transmit a first SCI to a second apparatus through a PSCCH, and transmit a second SCI to the second apparatus through a PSSCH related to the PSCCH. The first SCI may include information for a resource of the second SCI.

In an example, the first terminal of the embodiment may represent the first apparatus described throughout the present disclosure. In an example, the at least one processor, at least one memory, or the like in the apparatus for controlling the first terminal may be implemented as respective separate sub chips, or at least two or more components may be implemented through one sub chip.

According to an embodiment of the present disclosure, there may be provided a non-transitory computer readable storage medium storing instructions. The instructions may be executed by at least one processor of the non-transitory computer readable storage medium to transmit, by a first apparatus, a first SCI to a second apparatus through a PSCCH, and transmit, by the first apparatus, a second SCI to the second apparatus through a PSSCH related to the PSCCH. The first SCI may include information for a resource of the second SCI.

Figure 15:
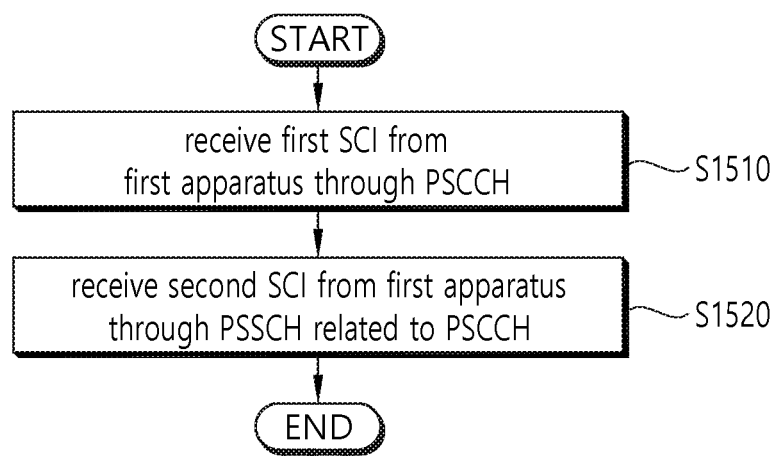
FIG. 15 is a flowchart showing an operation of a second apparatus, in accordance with an embodiment of the present disclosure.

FIG. 15 is a flowchart showing an operation of a second apparatus, in accordance with an embodiment of the present disclosure.

Operations disclosed in the flowchart of FIG. 15 may be performed in combination with various embodiments of the present disclosure. In an example, the operations disclosed in the flowchart of FIG. 15 may be performed based on at least one of apparatuses shown in FIG. 16 to FIG. 21. In another example, the operations disclosed in the flowchart of FIG. 15 may be performed by being combined in various manners with the operations disclosed in the flowchart of FIG. 13. In an example, a second apparatus of FIG. 15 may correspond to a second wireless device 200 of FIG. 17 described below. In another example, the second apparatus of FIG. 15 may correspond to a first wireless device 100 of FIG. 17 described below.

In step S1510, a second apparatus according to an embodiment may receive a first sidelink control information (SCI) from a first apparatus through a physical sidelink control channel (PSCCH).

In step S1520, the second apparatus according to an embodiment may receive a second SCI from the first apparatus through a physical sidelink shared channel (PSSCH) related to the PSCCH.

In an embodiment, the first SCI may include information for a resource of the second SCI.

In an embodiment, the information for the resource of the second SCI may include information on the number of resource elements (REs) to which the second SCI is mapped and a coding rate, information on the number of REs to which the second SCI is mapped, or information on the coding rate.

In an embodiment, the information on the number of REs to which the second SCI and the coding rate is mapped may include information on a beta offset.

In an embodiment, the information on the beta offset may include a beta offset indicator for indicating the beta offset.

In an embodiment, the information for the resource of the second SCI may further include information on an aggregation level.

In an embodiment, the information for the resource of the second SCI may be expressed by 2 bits.

In an embodiment, the first SCI may include at least one of information on a time or frequency resource of the PSSCH, modulation and coding scheme (MCS) information required for decoding of the PSSCH, and priority information for data on the PSSCH.

In an embodiment, the second SCI may include at least one of information on a source ID or destination ID for data on the PSSCH, hybrid automatic repeat request (HARQ) process ID information, a new data indicator (NDI), and a redundancy version (RV).

In an embodiment, a resource region for transmitting the first SCI and a resource region for transmitting the second SCI may not overlap with each other. In an example, the first control information signaled in a resource for the PSCCH and the second control information signaled in a resource for the PSSCH may not overlap with each other.

In an embodiment, the PSSCH may be decoded by the second apparatus, based on a result of decoding performed on the first SCI and second SCI by the second apparatus. For example, the data on the PSSCH may be decoded by the second apparatus, based on a result of decoding performed on the first SCI and second SCI by the second apparatus. That is, the second apparatus may be determined as a target apparatus, based on a result of decoding performed on the first SCI and second SCI by the second apparatus.

In an embodiment, the first SCI may be transmitted to a third apparatus through the PSCCH, and the PSSCH may not be decoded by the third apparatus, based on a result of decoding result performed on the first SCI and second SCI by the third apparatus. For example, the first SCI may be transmitted to a third apparatus through the PSCCH, and data on the PSSCH may not be decoded by the third apparatus, based on a result of decoding performed on the first SCI and second SCI by the third apparatus. That is, the third apparatus may be determined as a non-target apparatus, based on a result of decoding performed on the first SCI and second SCI by the third apparatus.

According to an embodiment of the present disclosure, there may be provided a second apparatus for performing SL communication. The second apparatus may include at least one memory storing instructions, at least one transceiver, and at least one processor coupling the at least one memory and the at least one transceiver. The at least one processor may be configured to control the at least one transceiver to receive a first sidelink control information (SCI) from a first apparatus through a physical sidelink control channel (PSCCH), and control the at least one transceiver to receive a second SCI from the first apparatus through a physical sidelink shared channel (PSSCH) related to the PSCCH. The first SCI may include information for a resource of the second SCI.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between terminals. In this case, a base station, a relay node, or the like may use the proposed method according to various embodiments of the present disclosure. For example, it may be defined that information on whether to apply the method according to various embodiments of the present disclosure is reported by the base station to the terminal or by a transmitting terminal to a receiving terminal through pre-defined signaling (e.g., physical layer signaling or higher layer signaling). For example, it may be defined that information on a rule according to various embodiments of the present disclosure is reported by the base station to the terminal or by a transmitting terminal to a receiving terminal through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
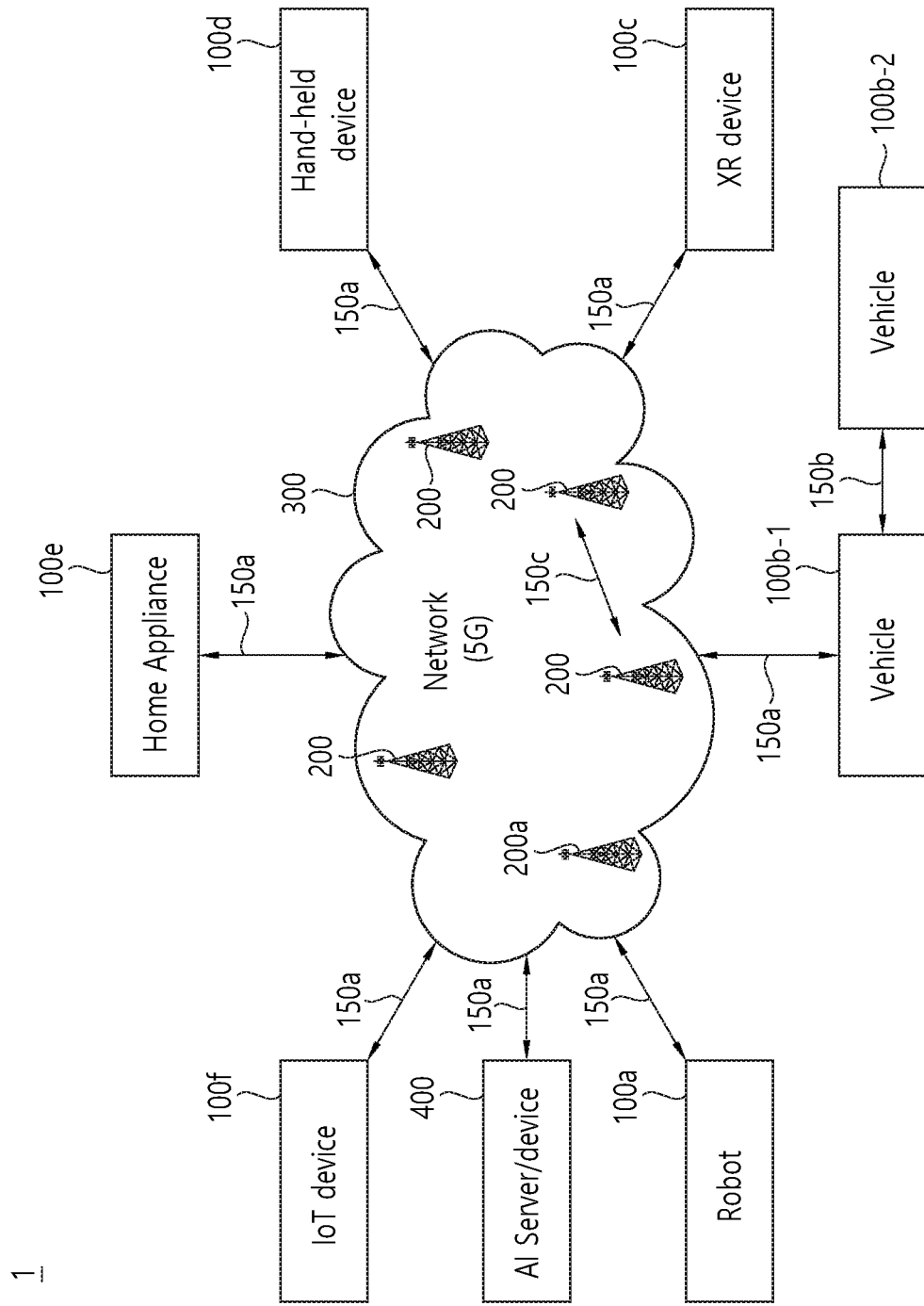
FIG. 16 shows a communication system 1, in accordance with an embodiment of the present disclosure.

FIG. 16 shows a communication system 1, in accordance with an embodiment of the present disclosure.

Referring to FIG. 16, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 17:
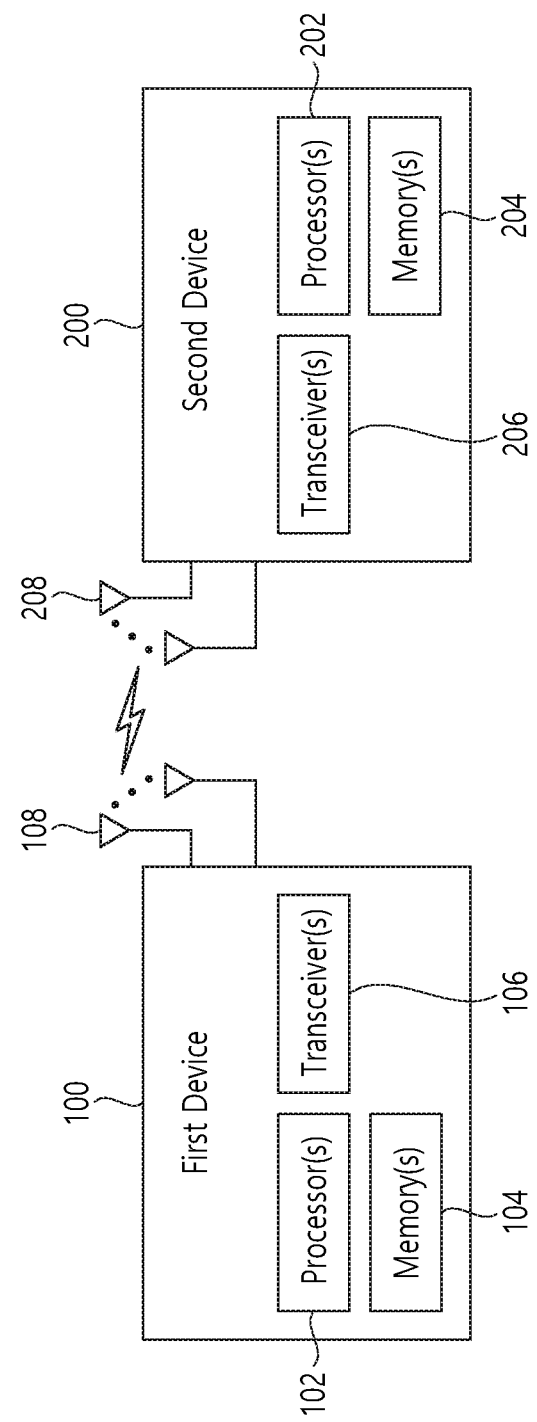
FIG. 17 shows wireless devices, in accordance with an embodiment of the present disclosure.

FIG. 17 shows wireless devices, in accordance with an embodiment of the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other apparatuses. The one or more transceivers 106 and 206 may receive user data, control information, and/or radio signals/channels, mentioned in the descriptions, functions, procedures, proposals, methods, and/or operational flowcharts disclosed in this document, from one or more other apparatuses. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other apparatuses. In addition, the one or more processors 102 and 202 may perform control so that the one or more transceivers 106 and 206 may receive user data, control information, or radio signals from one or more other apparatuses. In addition, the one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
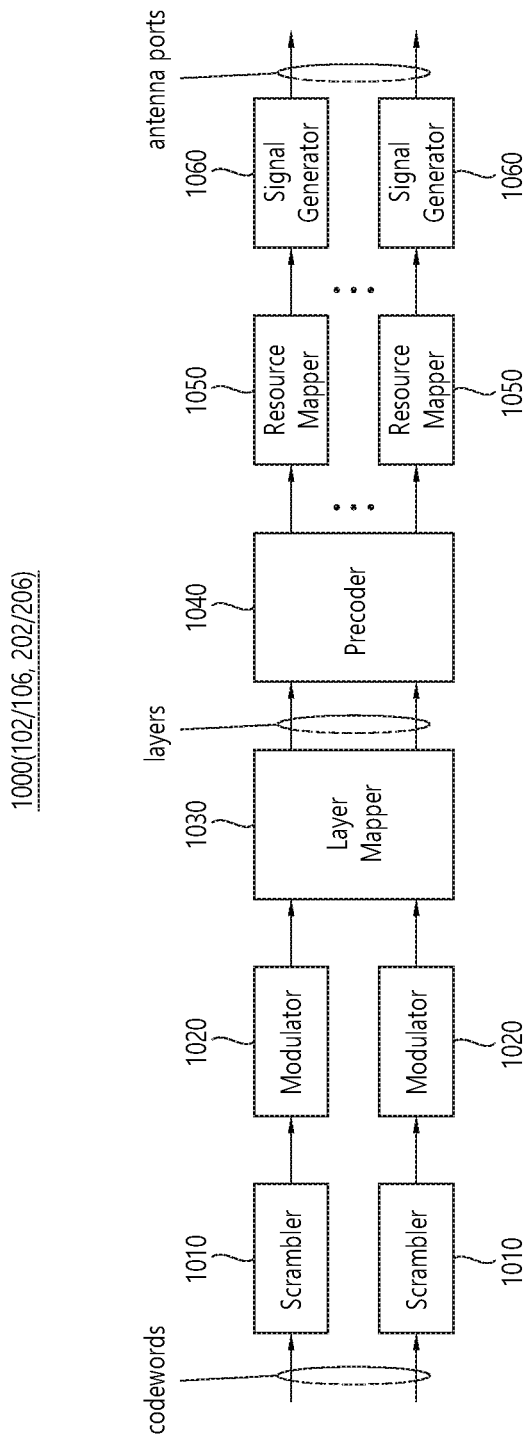
FIG. 18 shows a signal process circuit for a transmission signal, in accordance with an embodiment of the present disclosure.

FIG. 18 shows a signal process circuit for a transmission signal, in accordance with an embodiment of the present disclosure.

Referring to FIG. 18, a signal processing circuit 1000 may include scramblers 1010, modulators 1020, a layer mapper 1030, a precoder 1040, resource mappers 1050, and signal generators 1060. An operation/function of FIG. 18 may be performed by, without being limited to, the processors 102 and 202 and/or the transceivers 106 and 206 of FIG. 17. Hardware elements of FIG. 18 may be implemented by the processors 102 and 202 and/or the transceivers 106 and 206 of FIG. 17. For example, blocks 1010 to 1060 may be implemented by the processors 102 and 202 of FIG. 17. Alternatively, the blocks 1010 to 1050 may be implemented by the processors 102 and 202 of FIG. 17 and the block 1060 may be implemented by the transceivers 106 and 206 of FIG. 17.

Codewords may be converted into radio signals via the signal processing circuit 1000 of FIG. 18. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 18. For example, the wireless devices (e.g., 100 and 200 of FIG. 17) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 19:
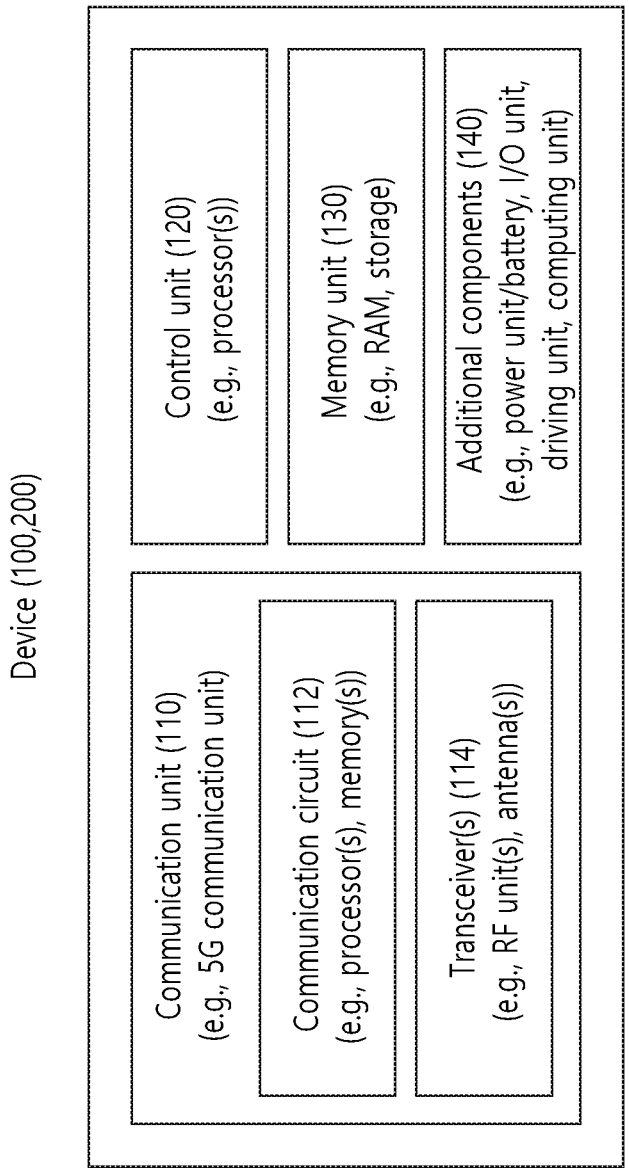
FIG. 19 shows a wireless device, in accordance with an embodiment of the present disclosure.

FIG. 19 shows a wireless device, in accordance with an embodiment of the present disclosure. The wireless device may be implemented in various forms according to a use-case/service (see FIG. 16).

Referring to FIG. 19, wireless devices 100 and 200 may correspond to the wireless devices 100 and 200 of FIG. 17 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 17. For example, the transceiver(s) 114 may include the one or more transceivers 106 and 206 and/or the one or more antennas 108 and 208 of FIG. 17. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. In addition, the control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 16), the vehicles (100b-1 and 100b-2 of FIG. 16), the XR device (100c of FIG. 16), the hand-held device (100d of FIG. 16), the home appliance (100e of FIG. 16), the IoT device (100f of FIG. 16), a digital broadcast terminal, a hologram device, a public safety device, an MTC device, a medicine device, a fintech device (or a finance device), a security device, a climate/environment device, the AI server/device (400 of FIG. 16), the BSs (200 of FIG. 16), a network node, etc. The wireless device may be used in a mobile or fixed place according to a use-example/service.

In FIG. 19, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 19 will be described in detail with reference to the drawings.

Figure 20:
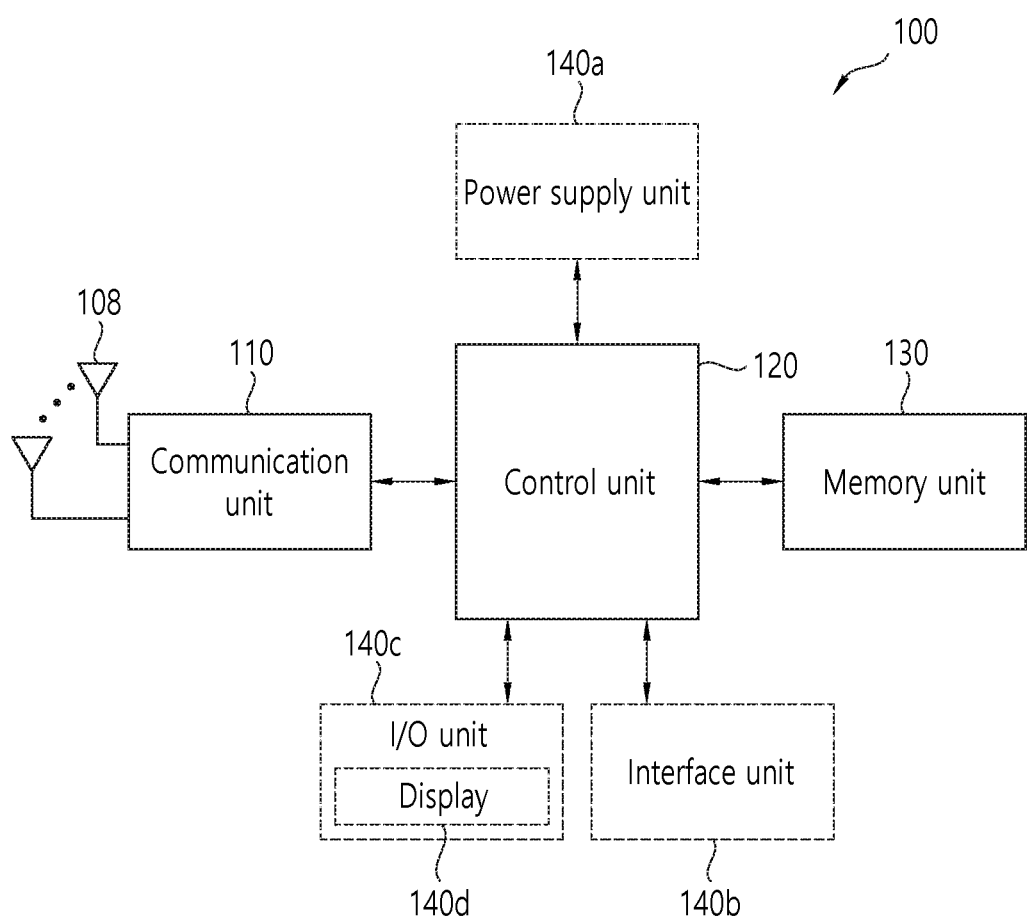
FIG. 20 shows a hand-held device, in accordance with an embodiment of the present disclosure.

FIG. 20 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a Mobile Station (MS), a User Terminal (UT), a Mobile Subscriber Station (MSS), a Subscriber Station (SS), an Advanced Mobile Station (AMS), or a Wireless Terminal (WT).

Referring to FIG. 20, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. In addition, the memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 21:
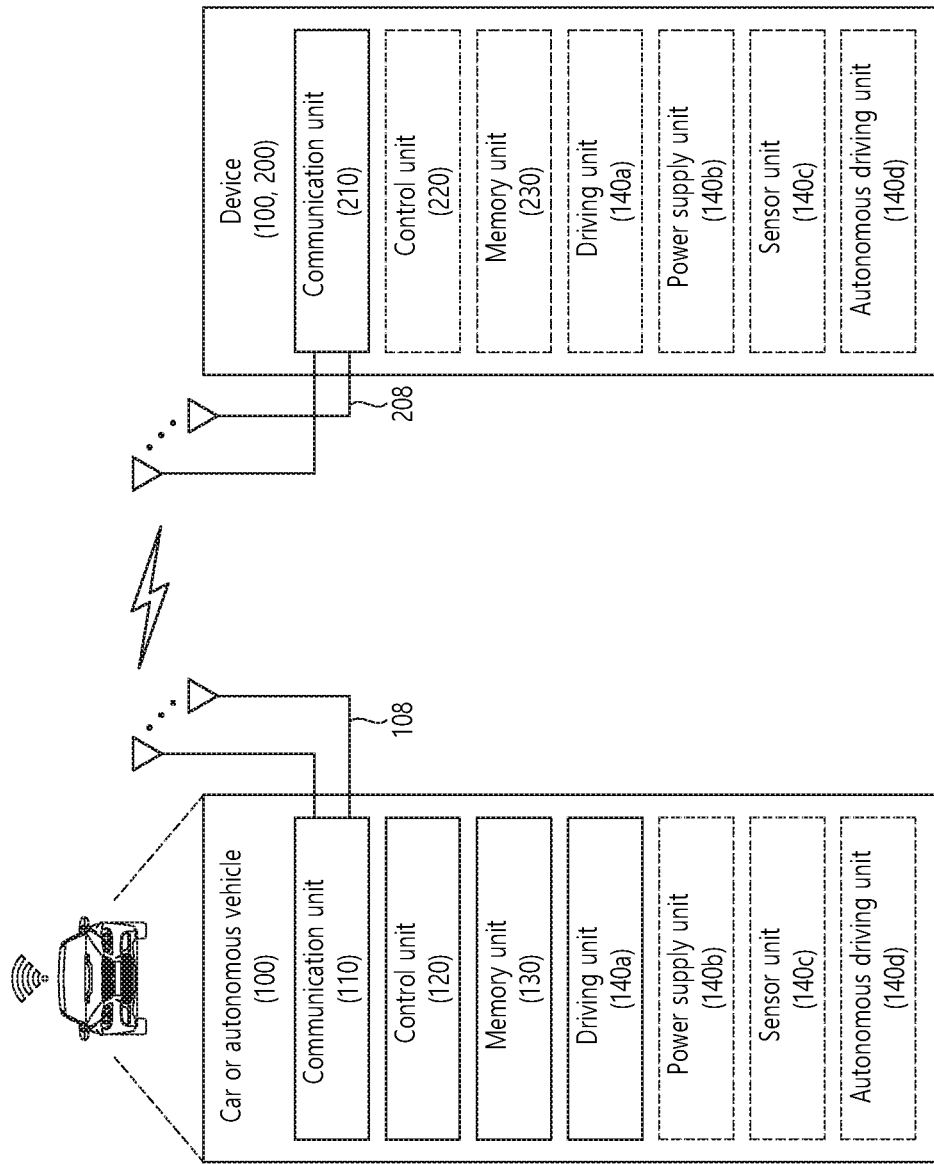
FIG. 21 shows a car or an autonomous vehicle, in accordance with an embodiment of the present disclosure.

FIG. 21 shows a car or an autonomous vehicle, in accordance with an embodiment of the present disclosure. The car or autonomous vehicle may be implemented by a mobile robot, a car, a train, a manned/unmanned Aerial Vehicle (AV), a ship, etc.

Referring to FIG. 21, a car or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 19, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In addition, in the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing sidelink (SL) communication by a first apparatus, the method including:
   transmitting a first sidelink control information (SCI) to a second apparatus through physical sidelink control channel (PSCCH); and
   transmitting a second SCI to the second apparatus through physical sidelink shared channel (PSSCH) related to the PSCCH,
   wherein the first SCI includes information for resource of the second SCI, and
   wherein the information for the resource of the second SCI includes information on number of resource elements (REs) to which the second SCI is mapped and a coding rate.

2. The method of claim 1, wherein the information on the number of REs to which the second SCI is mapped and the coding rate is mapped includes information on a beta offset.

3. The method of claim 2, wherein the information on the beta offset includes a beta offset indicator for indicating the beat offset, and wherein the beta offset indicator is represented by 2 bits.

4. The method of claim 1, wherein the first SCI includes at least one of information on a time or frequency resource of the PSSCH, modulation and coding scheme (MCS) information required in decoding of the PSSCH, and priority information for data on the PSSCH.

5. The method of claim 1, wherein the second SCI includes at least one of information on a source ID or destination ID for data on the PSSCH, hybrid automatic repeat request (HARQ) process ID information, a new data indicator (NDI), and a redundancy version (RV).

6. The method of claim 1, wherein a resource region for transmitting the first SCI and a resource region for transmitting the second SCI do not overlap with each other.

7. The method of claim 1, wherein data on the PSSCH is decoded by the second apparatus, based on a result of decoding performed on the first SCI and the second SCI by the second apparatus.

8. The method of claim 6,
   wherein the first SCI is transmitted to a third apparatus through the PSSCH, and
   wherein the data on the PSSCH is not decoded by the third apparatus, based on a result on decoding performed on the first SCI and the second SCI by the third apparatus.

9. A first apparatus for performing SL communication, comprising:
   at least one memory storing instructions;
   at least one transceiver; and
   at least one processor coupling the at least one memory and the at least one transceiver,
   wherein the at least one processor is configured to:
   control the at least one transceiver to transmit a first sidelink control information (SCI) to a second apparatus through a physical sidelink control channel (PSCCH); and
   control the at least one transceiver to transmit a second SCI to the second apparatus through a physical sidelink shared channel (PSSCH) related to the PSCCH,
   wherein the first SCI includes information for resource of the second SCI, and
   wherein the information for the resource of the second SCI includes information on number of resource elements (REs) to which the second SCI is mapped and a coding rate.

10. The first apparatus of claim 9, wherein the information on the number of REs to which the second SCI is mapped and the coding rate includes information on a beta offset.

11. The first apparatus of claim 9, wherein the information on the beta offset includes a beta offset indicator for indicating the beta offset, and
    wherein the beta offset indicator is represented by 2 bits.

12. The first apparatus of claim 9, wherein a resource region for transmitting the first SCI and a resource region for transmitting the second SCI do not overlap with each other.

13. An apparatus controlling a first apparatus, the apparatus comprising:
    at least one processor; and
    at least one computer memory coupled by the at least one processor in an executable manner and storing instructions,
    wherein the at least one processor executes the instructions, so that the first terminal is configured to:
    transmit a first sidelink control information (SCI) to a second apparatus through a physical sidelink control channel (PSCCH); and
    transmit a second SCI to the second apparatus through a physical sidelink shared channel (PSSCH) related to the PSCCH,
    wherein the first SCI includes information for resource of the second SCI, and
    wherein the information for the resource of the second SCI includes information on number of resource elements (REs) to which the second SCI is mapped and a coding rate.

* * * * *